Dec. 22, 1959　　　S. A. H. SCHMAUS　　　2,918,546
ADJUSTABLE LINKAGE FOR MEASURING DEVICE
Filed Dec. 22, 1955　　　　　　　　　　2 Sheets-Sheet 1
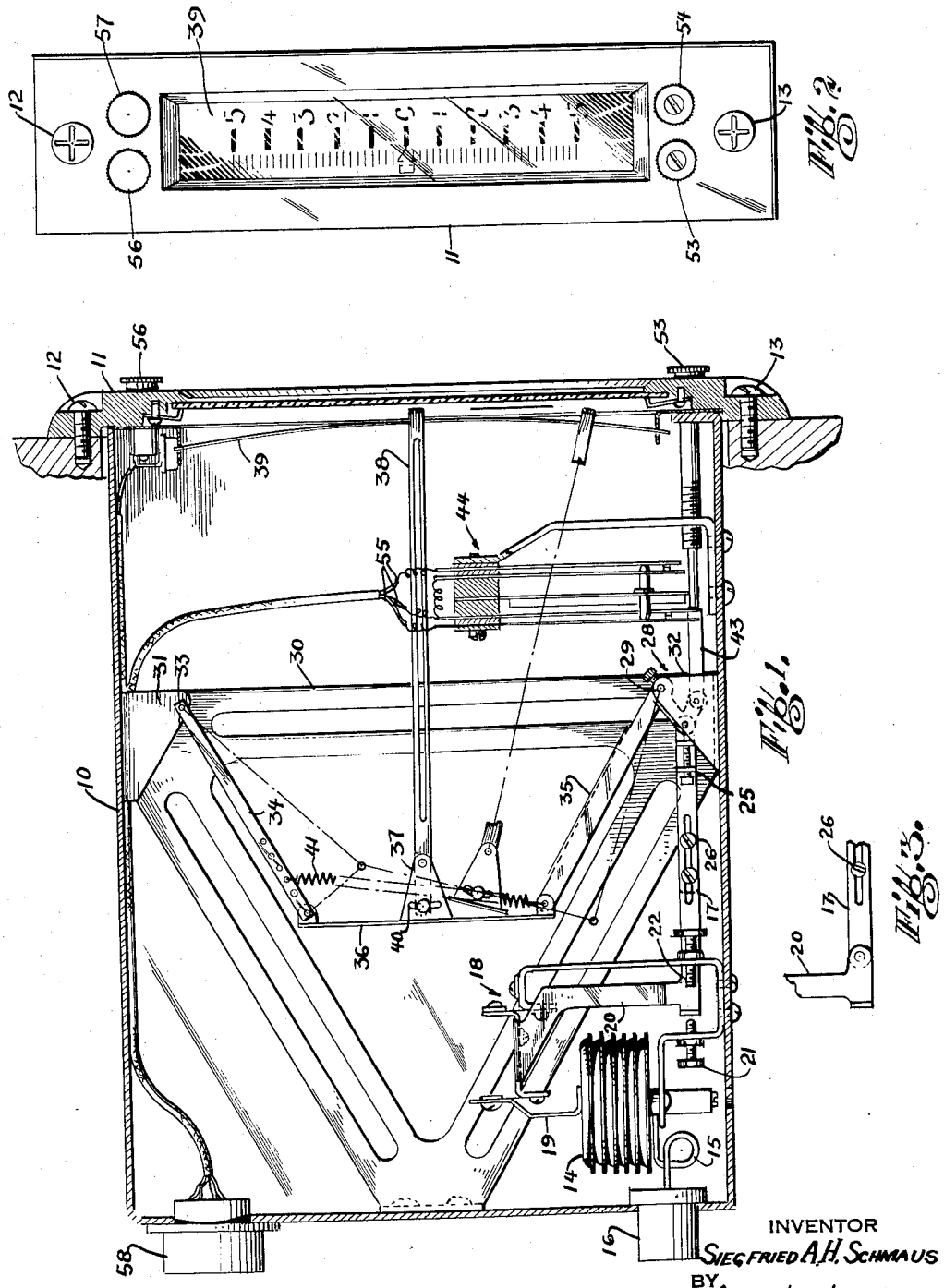
INVENTOR
SIEGFRIED A.H. SCHMAUS
BY
Pollard, Johnston, Smythe & Robertson
ATTORNEYS Dec. 22, 1959      S. A. H. SCHMAUS      2,918,546
ADJUSTABLE LINKAGE FOR MEASURING DEVICE
Filed Dec. 22, 1955      2 Sheets-Sheet 2
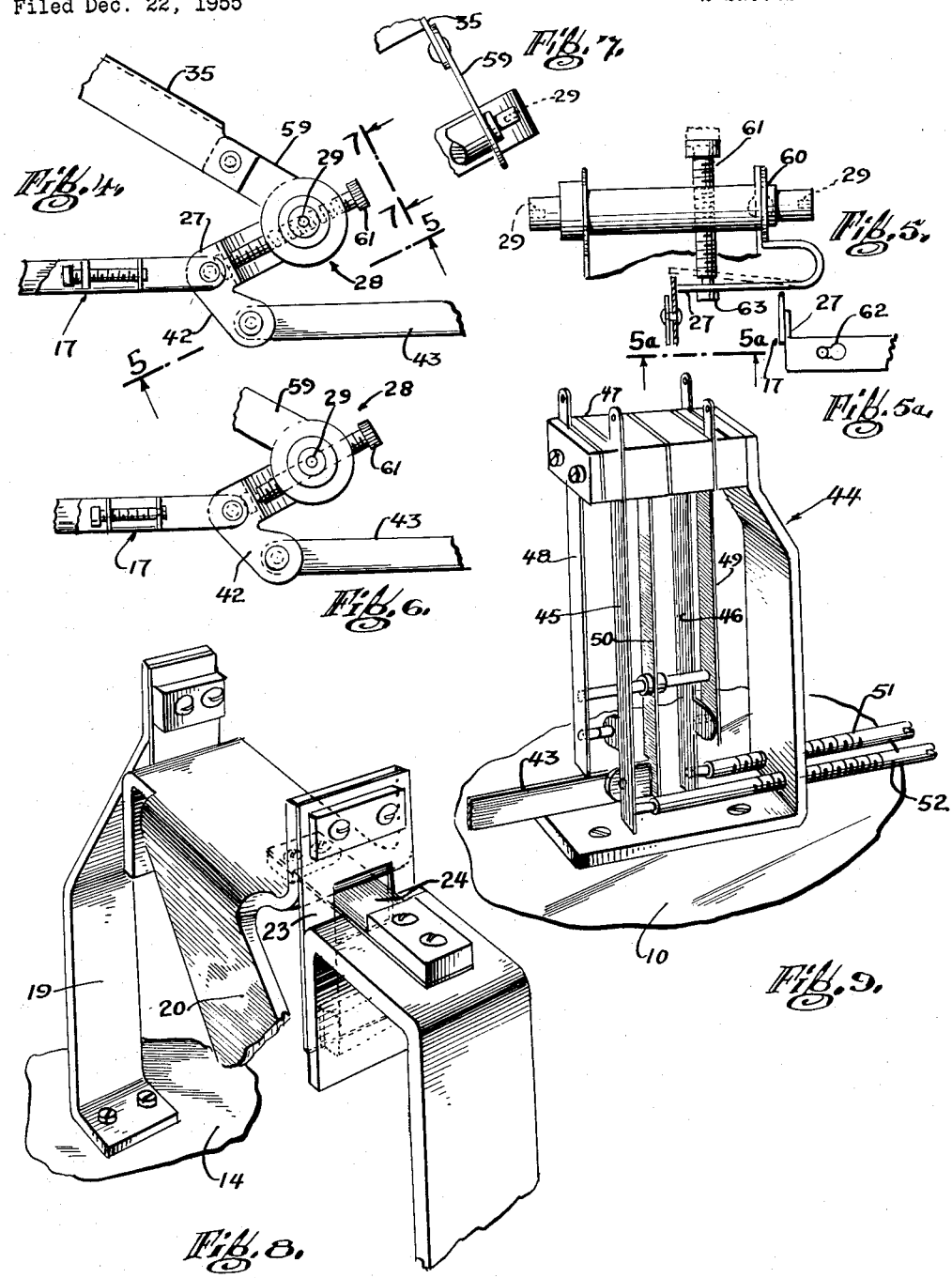
INVENTOR
SIEGFRIED A.H. SCHMAUS
BY
Pollard, Johnston, Smythe & Robertson
ATTORNEYS United States Patent Office 2,918,546
Patented Dec. 22, 1959

2,918,546

ADJUSTABLE LINKAGE FOR MEASURING DEVICE

Siegfried A. H. Schmaus, Philadelphia, Pa., assignor to American Machine and Metals, Inc., New York, N.Y., a corporation of Delaware Application December 22, 1955, Serial No. 554,713

2 Claims. (Cl. 200—83)

This invention relates to condition measuring systems, and more particularly to an improved linkage arrangement for use in such systems.

Condition measuring systems generally employ a sensing means which produces either mechanical or electrical output signals that are proportional to the magnitude of the condition being measured. The output signals are then transmitted to an indicator unit which provides an indication of the values of the condition being measured. When the output signal from the sensing means is of a mechanical nature, a linkage arrangement is customarily employed to transmit the signal to the indicator unit. The linkage arrangement employed must operate with a minimum frictional loss and with a minimum of lost motion or "play" of its component parts to provide for maximum accuracy of the measuring system. Accordingly, the number of component parts of the linkage should be kept as small as possible. However, this is not readily achieved, since the linkage arrangement must usually perform other functions beside the direct transmittal of the signal from the sensing means.

One such function is the adjustment of the span or range of the indicator unit of the system. Where the condition being measured varies over wide ranges, it is often desired to suitably adjust the range of the indicator unit so that maximum or "full scale" deflection is obtained for the particular range of values of the measured condition. When a mechanical linkage arrangement is employed in the system, the span adjustment is most conveniently made in the linkage arrangement itself, but usually at the expense of increased frictional losses and play due to the increased number of parts.

Another function of the linkage arrangement is that of motion conversion usually determined by the type of indicator unit employed in the system. Where the indicator unit consists of a vertical substantially straight scale plate with associated indicator arm, it is desirable to have the free end of the indicator arm follow a substantially rectilinear path along the face of the plate. This permits the measuring system to occupy a much smaller space than if a curved scale plate were employed. However, the rectilinear motion required at the end of the indicator arm necessitates the use of additional parts in the linkage to effect the motion conversion.

Accordingly, it is an object of this invention to provide a linkage arrangement for a condition measuring system wherein the linkage arrangement operates with a minimum of frictional loss and play.

It is a further object of this invention to provide a linkage arrangement for a condition measuring system wherein span adjustments and motion conversion are obtained without materially affecting the accuracy of the system.

It is a still further object of this invention to provide a linkage arrangement for a condition measuring system wherein the linkage arrangement is economical to manufacture and maintain.

Briefly, the linkage arrangement of the invention is capable of use with a sensing means that produces a mechanical movement of its output member in response to changes in the condition being measured. The indicator unit may be of the type having a straight graduated scale plate and an indicator arm, the end of which moves over the face of the plate along a substantially rectilinear path to provide indications of the measured condition. Support means are provided having two pivot points located thereon. A first lever means has one end thereof pivotally connected to one of the pivot points, and a second lever means is similarly pivotally connected to the other of the pivot points. The free ends of the lever means are pivotally connected to a cross-bar means which carries the movable indicator arm at a point equidistant from its pivoted connections. A linkage means of the bell-crank type is arranged to rotate about one of said pivot points and has its first leg connected to one end of a connecting link of adjustable length. The other end of the connecting link is connected to the output member of the sensing means through a motion amplifying device. The said first leg of the linkage means may have an extension formed thereon which is pivotally connected to the actuating member of a switch means. Indicator means may be arranged for control by the switch means to indicate selected values of the condition being measured. The second leg of the bell-crank type linkage means is pivotally connected to one of the lever means to rotate it about its fixed pivot point in response to movement of the output member of the sensing means. Thus, movement of the output member of the sensing means operates both the switch means and the indicator arm.

In order to vary the span adjustment of the indicator arm, the linkage means is arranged to be deformable in a plane perpendicular to its axis of rotation. This effectively varies the "active" length of the first leg of the bell-crank type linkage means. Span adjusting means are provided to deform the linkage means. The adjusting means comprises a screw member having one end thereof affixed to the linkage means at a point between its fixed pivot point and the pivoted connections on its first leg. The screw member also passes through a supporting shaft located along the axis of rotation of the linkage means and which is rotatable therewith.

These and other objects, advantages and features of the invention will become apparent from the following description and drawings which are merely exemplary.

In the drawings:

Fig. 1 illustrates a vertical section of a condition measuring instrument constructed in accordance with the invention;

Fig. 2 shows the front panel of the instrument;

Fig. 3 is a detail view showing certain features of construction of the connecting link;

Fig. 4 is a side elevation of the deformable linkage means employed in the linkage assembly;

Fig. 5 is a sectional view taken along line 5—5 in Fig. 4;

Fig. 5a is a sectional view taken along line 5a—5a in Fig. 5;

Fig. 6 illustrates the linkage means of the invention in a different position of adjustment;

Fig. 7 is a sectional view showing certain details of construction taken along line 7—7 of Fig. 4;

Fig. 8 is a view showing the details of construction of the motion amplifying means employed in the condition measuring system; and Fig. 9 is a view showing the details of construction of the switch means employed in the condition measuring system.

Referring first to Fig. 1 of the drawing, there is shown a condition measuring system adapted for use with so-called "air-gauging" apparatus. Such air gauging apparatus is conventional and will not be explained in detail. However, such apparatus generally employs a nozzle which is connected to a source of air pressure through a line having a restriction therein. When a work piece is placed in proximity to the nozzle, it effectively varies the back pressure in the nozzle feed line in accordance with the distance of the work piece from the nozzle. Accordingly, the back pressure variations may be used as indications of distance and hence dimensions. Where bore diameters are to be measured, a so-called "go-no go" system is utilized to expedite production. In mechanical gauges, this involves the use of two plugs of different diameters which are alternately insertable in the bore. One plug is machined to the maximum tolerance permitted, while the other plug is machined to the minimum tolerance permissible. With an air gauge, a plug having air conduits is chosen to produce selected values of back pressure in the air gauging system depending upon the size of the aperture.

The instrument shown in Fig. 1 is adapted for use with such a system and includes a casing 10 having a face plate 11 which is adapted for panel mounting by means of screws 12 and 13. A sensing means 14 which may comprise a barometer of the aneroid type or a stack of so-called pressure wafers as illustrated is connected to the air gauging nozzle (not shown) by means of tube 15 and fitting 16. The pressure sensing means is connected to a connecting link 17 through a motion amplifying device 18. The motion amplifying device is shown in detail in Fig. 8 and is a conventional "X type" connecting arrangement. The input member 19 of the motion amplifying device is connected to the top of the stack of pressure wafers so as to be movable therewith. The output member 20 is pivotally connected to the connecting link 17 as illustrated in Fig. 3. Stop means 21 and 22 are adjustable to limit movement of the output member 20. It will be noted that the X-type connecting arrangement permits of substantially frictionless motion amplification due to the use of springs 23 and 24 which co-act to form a "hinge" means. Thus, vertical movement of the input member 19 results in rotational movement of the output member 20 which is transmitted to the connecting link 17.

The length of the connecting link 17 is adjusted by means of a conventional screw and collar arrangement 25 and the setting thereof made secure by the use of screws 26. The end of the connecting link 17 is connected to a first leg 27 of a "bell crank" linkage means designated generally as 28. The linkage means 28 is arranged to rotate about a pivot point 29 which is located on support means 30. The support means 30 is composed of a triangular structural member which is connected to the casing 10 by suitable means not shown. The upper and lower portions of the supporting means 30 are bent over to form U-shaped supports 31 and 32. The lower support 32 contains the pivot point 29, while the upper support 31 contains the pivot point 33.

A first lever means 34 is arranged to rotate about pivot point 33, while a second lever means 35 is arranged to rotate about the pivot point 29. Cross-bar means 36 pivotally connects the free ends of the lever means 34 and 35 and has affixed to a bracket 37 formed at its midpoint on indicator arm 38. The indicator arm 38 is arranged for substantially rectilinear movement along the scale plate 39 located on the front panel of the instrument. Minor adjustments of the setting of the indicator arm 38 may be effected by slot and screw arrangement 40 located in the bracket 37. As shown in Fig. 1, when either lever means 34 or 35 is rotated about its fixed pivot point, the free end of the indicator arm 38 will be caused to follow a substantially rectilinear path adjacent the scale plate 39. The broken line construction in Fig. 1 illustrates the movement of the indicator arm for a certain rotation of the lever means 35.

Spring means 41 may be employed, if desired, to produce a predetermined tension in the operating linkage and reduce the play thereof. If also serves to counterbalance the pointer. It will be noted that the first leg 27 of the linkage means 28 has an extension 42 formed thereon which pivotally connects the connecting link 17 with the actuating member 43 of switch means 44. As seen in Fig. 9 of the drawing, switch means 44 comprises fixed contacts 45 and 46 which are supported in block 47. The movable contacts 48 and 49 are similarly supported in block 47 and form with contacts 45 and 46 a pair of normally closed switches. The actuating member 43 is pivotally connected to a striker unit 50 which operates to move contacts 48 or 49 depending upon the direction and degree of movement thereof. Screws 51 and 52 are provided to adjust the spacing of the fixed contacts 45 and 46 and for easy adjustment purposes are brought out through openings 53 and 54 in the front panel of the instrument. The leads 55 from the switch means are connected to "go-no go" indicator lights 56 and 57 and also to a source of power through connecting unit 58. If desired, the switch means 44 may also control other operating units located a distance from the described instrument.

The span adjustment of the condition measuring system is effected by means of the bell crank type linkage means 28. To this end, the second leg 59 of the linkage means is pivotally connected to lever means 35 as indicated in Figs. 4 and 7 of the drawing. The linkage means is formed of substantially spring-like material which is capable of deformation and is bent back upon itself as shown in Fig. 5. The fixed pivot point of the linkage means is placed over a supporting shaft 60 which rotates on the pivotal axis of the linkage means. After assembly, the end of the supporting shaft is staked over so that the supporting shaft rotates with the linkage means. A screw member 61 is inserted through a keyhole slot 62 in the portion of the linkage means located between its fixed pivot point and the pivoted connections on its first leg 27 as seen in Figs. 5 and 5a. An abutment means 63 located on the end of the screw 61 securely holds the linkage means to the screw. The body of the screw member 61 is inserted through the supporting shaft and is perpendicular to the axis of rotation of the linkage means. As can be seen by a comparison of Figs. 4 and 6, when the screw is rotated, the effective length of the first leg of the linkage means is varied, since the material of the linkage means is deformable. This effective reduction in the length of the first leg of the linkage means varies the ratio of movement between the lever means 35 and the connecting link 17, thus varying the span adjustment of the indicator arm 38. As can be seen, an extremely accurate adjustment may be made by this means and is one which substantially reduces play of the linkage assembly.

In operation, as the pressure transmitted to the sensing means 14 varies, the output motion of the sensing means will be amplified by the amplifying device 18 and transmitted to the first leg of the linkage means 28 by the connecting link 17. This translational motion is converted to rotary motion of lever means 35 by means of the bellcrank type linkage means. As lever means 35 is rotated, the indicator arm 38 will move rectilinearly along the scale plate 39 to provide an indication of the pressures. At the same time, the extension on the first leg of the linkage means serves to actuate the switch means 44 and thus operate indicator lights 56 and 57 at selected values of the measured pressure. This arrangement permits the operator to see at a glance whether the tolerance of the work piece has been exceeded in either direction.

It should be apparent that modifications may be made in the construction and arrangement without departing from the spirit of the invention except as defined in the appended claims.

What is claimed is:

1. In a system for measuring a variable condition and indicating a predetermined value, the combination comprising sensing means operable to produce a mechanical movement of its output member in response to changes in the condition being measured; motion amplifying means connected between the output member of said sensing means and one end of a connecting link of adjustable length; electrically operated indicator means adapted to indicate selected values of the condition being measured; switch means having an actuating member included therein and being operable to selectively control said indicating means; support means having first and second pivot points thereon; first lever means having one end thereof pivoted about said first pivot point; second lever means having one end thereof pivoted about said second pivot point; cross-bar means pivotally connecting the free ends of said first and second lever means and having one end of an indicator arm rigidly affixed thereto at a point equidistant from its pivoted connections, the other end of said indicator arm being operable to follow a substantially rectilinear path upon rotation of said second lever means about its fixed pivot point to indicate values of the condition being measured; linkage means of the bell-crank type arranged for rotation about said second pivot point and having a first leg thereof pivotally connected to the other end of said connecting link and a second leg thereof connected to said second lever means such that said second lever means is rotated about its fixed point in response to movement of the output member of the sensing means, said linkage means having an extended portion on its first leg which is pivotally connected to the actuating member of said switch means to selectively control the operation of the switch means in response to movement of the output member of the sensing means, the linkage means being deformable in a plane perpendicular to its axis of rotation to vary the span adjustment of the indicator arm; and span adjusting means operable to deform said linkage means, said span adjusting means comprising a screw member having one end thereof affixed to the portion of the linkage means intermediate its fixed pivot point and the pivoted connections on its said first leg, the other end of said screw member passing through a supporting shaft rotatable with said linkage means and located along its axis of rotation.

2. In a system for measuring a variable condition and indicating a predetermined value, the combination comprising sensing means operable to produce a mechanical movement of its output member in response to changes in the condition being measured; indicator means adapted to indicate selected values of the condition being measured; support means having first and second pivot points thereon; first lever means having one end thereof pivoted about said first pivot point; second lever means having one end thereof pivoted about said second pivot point; cross-bar means pivotally connecting the free ends of said first and second lever means and having one end of an indicator arm rigidly affixed thereto at a point equidistant from its pivoted connections, the other end of said indicator arm being operable to follow a substantially rectilinear path upon rotation of said second lever means about its fixed pivot point to indicate values of the condition being measured; linkage means of the bell-crank type arranged for rotation about said second pivot point and having a first leg thereof pivotally connected to the other end of said connecting link and a second leg thereof connected to said second lever means such that said second lever means is rotated about its fixed point in response to movement of the output member of the sensing means, said linkage means having an extended portion on its first leg which is pivotally connected to the actuating member of said switch means to selectively control the operation of the switch means in response to movement of the output member of the sensing means, the linkage means being deformable in a plane perpendicular to its axis of rotation to vary the span adjustment of the indicator arm; and span adjusting means operable to deform said linkage means, said span adjusting means comprising a screw member having one end thereof affixed to the portion of the linkage means intermediate its fixed pivot point and the pivoted connections on its said first leg, the other end of said screw member passing through a supporting shaft rotatable with said linkage means and located along its axis of rotation.

References Cited in the file of this patent

UNITED STATES PATENTS

| | | |
|---|---|---|
| 2,025,097 | Dougherty | Dec. 24, 1935 |
| 2,567,519 | Livingston | Sept. 11, 1951 |
| 2,594,136 | DiMaggio | Apr. 22, 1952 |
| 2,628,501 | Knapp | Feb. 17, 1953 |
| 2,697,147 | Harland | Dec. 14, 1954 |